US012789386B2

(12) United States Patent
Roux et al.

(10) Patent No.: US 12,789,386 B2
(45) Date of Patent: Nov. 10, 2026

(54) ROBOTIC POLISHING SYSTEM AND METHOD FOR USING SAME

(71) Applicant: Pratt & Whitney Canada Corp., Longueuil (CA)

(72) Inventors: Thomas Roux, Montreal (CA); Guillaume Whittom, Longueuil (CA); Canam Hoang, Longueuil (CA); Jean-Francois Collette, Montreal (CA); Guillaume Fortier, Saint-Sauveur (CA); Philippe Morin, Beloeil (CA); Pierre-Luc Nault, Sainte-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 288 days.

(21) Appl. No.: 18/397,973

(22) Filed: Dec. 27, 2023

(65) Prior Publication Data

US 2024/0208074 A1 Jun. 27, 2024

Related U.S. Application Data

(60) Provisional application No. 63/435,537, filed on Dec. 27, 2022.

(51) Int. Cl.

*B25J 11/00* (2006.01)
*B25J 13/08* (2006.01)
*B25J 15/00* (2006.01)

(52) U.S. Cl.

CPC ......... *B25J 11/0065* (2013.01); *B25J 13/087* (2013.01); *B25J 15/0019* (2013.01)

(58) Field of Classification Search

CPC .... B25J 11/0065; B25J 13/086; B25J 13/087; B25J 15/0019; B24B 19/14; B24B 23/06;

(Continued)

(56) References Cited

U.S. PATENT DOCUMENTS 2,617,239 A * 11/1952 Steurer .................. B24B 23/06 451/355
8,512,096 B2 * 8/2013 Ahti ...................... B24B 21/12 451/296

(Continued)

FOREIGN PATENT DOCUMENTS

CN 113977415 A * 1/2022 ............ B24B 49/00
EP 2995421 B1 1/2022

(Continued)

OTHER PUBLICATIONS

EP Search Report for EP Patent Application No. 23220622.7 dated May 6, 2024.

*Primary Examiner* — Nathaniel E Wiehe
*Assistant Examiner* — Justin A Pruitt
(74) *Attorney, Agent, or Firm* — Getz Balich LLC

(57) ABSTRACT

A polishing system includes an end effector and a controller. The end effector includes a polishing arm, a motor, a tool head, and a belt sensor. The polishing arm includes a motor housing at a distal end of the polishing arm. The tool head includes a belt tensioner and a roller. The belt tensioner includes a tool extension including the roller. The tool head is configured to retain an abrasive belt extending between the motor and the roller. The belt sensor includes a proximity sensor and a lateral tab. The proximity sensor is disposed at the motor housing. The lateral tab disposed at the tool extension. The proximity sensor is configured to measure a distance between the proximity sensor and the lateral tab and generate a proximity sensor signal. The controller is configured to cause the processor to identify an installation configuration for the abrasive belt by comparing the measured distance to a distance threshold value.

20 Claims, 6 Drawing Sheets

(58) Field of Classification Search

CPC ....... B24B 21/00; B24B 21/004; B24B 21/04; B24B 21/12; B24B 21/16; B24B 21/165; B24B 21/20

USPC .......................................................... 451/415

See application file for complete search history.

(56) References Cited

U.S. PATENT DOCUMENTS

| | | | | |
|---|---|---|---|---|
| 11,331,769 | B2 * | 5/2022 | Kamimura | B24B 41/06 |
| 2009/0149119 | A1 | 6/2009 | Ahti | |
| 2022/0331929 | A1 | 10/2022 | Carter | |

FOREIGN PATENT DOCUMENTS

| | | | | |
|---|---|---|---|---|
| FR | 2677289 | A1 * | 12/1992 | B24B 21/20 |
| FR | 2677289 | B1 | 12/1995 | |
| JP | H02131857 | A | 5/1990 | |
| WO | 2021099926 | A1 | 5/2021 | |

* cited by examiner

ROBOTIC POLISHING SYSTEM AND METHOD FOR USING SAME

This application claims priority to U.S. Patent Appln. No. 63/435,537 filed Dec. 27, 2022, which is hereby incorporated herein by reference in its entirety.

TECHNICAL FIELD

This disclosure relates generally to robotic machining systems, more particularly, to systems and methods for identifying an installation condition of an abrasive belt for the robotic polishing system.

BACKGROUND OF THE ART

Robotic machining systems may be used to accomplish one or more machining (e.g., polishing) operations for the manufacture of components. Various robotic machining systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a polishing system includes an end effector and a controller. The end effector includes a polishing arm, a motor, a tool head, and a belt sensor. The polishing arm includes a motor housing at a distal end of the polishing arm. The motor is mounted within the motor housing. The tool head extends along a lengthwise axis between and to an inner end and a tip end. The inner end is disposed on the polishing arm at the motor. The tool head includes a belt tensioner and a roller. The belt tensioner includes a tool extension including the tip end. The belt tensioner is configured to bias the tip end outward from the inner end along the lengthwise axis. The roller is rotatable about a tool center point of the tool head at the tip end. The tool head is configured to retain an abrasive belt extending between the motor and the roller. The belt sensor includes a proximity sensor and a lateral tab. The proximity sensor is disposed at the motor housing. The lateral tab disposed at the tool extension. The proximity sensor is configured to measure a distance between the proximity sensor and the lateral tab and generate a proximity sensor signal representative of the measured distance. The controller is in signal communication with the proximity sensor. The controller includes a processor in communication with a non-transitory memory storing instructions, which instructions when executed by the processor, cause the processor to identify an installation configuration for the abrasive belt by comparing the measured distance to a distance threshold value.

In any of the aspects or embodiments described above and herein, the instructions, when executed by the processor, may further cause the processor to identify the installation configuration for the abrasive belt by identifying an installed condition of the abrasive belt for the measured distance less than the distance threshold value and an uninstalled condition of the abrasive belt for the measured distance greater than the distance threshold value.

In any of the aspects or embodiments described above and herein, the polishing system may further include a robotic polishing assembly including a robotic arm and the end effector. The robotic arm may include a plurality of movable joints extending between and to a base end and a distal end. The end effector may be disposed at the distal end.

In any of the aspects or embodiments described above and herein, the instructions, when executed by the processor, may further cause the processor to control the robotic polishing assembly to prevent the robotic polishing assembly from performing a polishing process on a workpiece with the uninstalled condition identified for the abrasive belt.

In any of the aspects or embodiments described above and herein, the instructions, when executed by the processor, may further cause the processor to verify an abrasive belt configuration with the abrasive belt installed on the end effector. The abrasive belt configuration may include includes, at least, a grit of the abrasive belt.

In any of the aspects or embodiments described above and herein, the proximity sensor may be configured as an inductive sensor.

In any of the aspects or embodiments described above and herein, the tool extension may extend along the lengthwise axis between and to a first end and a second end. The tip end may be disposed at the second end. The tool extension may further include a first lateral side and a second lateral side. The first lateral side and the second lateral side may extend between and to the first end and the second end. The lateral tab may be disposed on the first lateral side at the first end.

In any of the aspects or embodiments described above and herein, the belt sensor may include a guide tab extending outward from the motor housing. The guide tab may be disposed axially coincident with the lateral tab. The guide tab may be further disposed laterally outward of the lateral tab.

In any of the aspects or embodiments described above and herein, the lateral tab may be disposed in sliding contact with the guide tab.

In any of the aspects or embodiments described above and herein, the belt tensioner may further include a tool guide and a spring. The tool guide may include the inner end. The tool guide may be mounted to the motor housing. The spring may be positioned between the tool guide and the tool extension. The spring may be configured to bias the tool extension away from the tool guide along the lengthwise axis.

In any of the aspects or embodiments described above and herein, the tool extension may include an extension body forming an internal bore of the tool extension. The spring and the tool guide may be disposed within the internal bore.

According to another aspect of the present disclosure, a method for identifying an installation condition of an abrasive belt on a tool head of a polishing system includes biasing a tool extension of the tool head outward from a motor housing along a lengthwise axis, measuring a distance between a proximity sensor and a lateral tab. The proximity sensor is disposed on the motor housing and the lateral tab is disposed on the tool extension. The method further includes identifying an installation condition of the abrasive belt on the tool head by comparing the measured distance to a distance threshold value. The installation condition includes an installed condition of the abrasive belt or an uninstalled condition of the abrasive belt.

In any of the aspects or embodiments described above and herein, identifying the installation condition of the abrasive belt may include identifying the installed condition of the abrasive belt for the measured distance less than or equal to the distance threshold value.

In any of the aspects or embodiments described above and herein, identifying the installation condition of the abrasive belt may include identifying the uninstalled condition of the abrasive belt for the measured distance greater than or equal to the distance threshold value.

According to another aspect of the present disclosure, a polishing system includes a robotic polishing assembly. The robotic polishing assembly includes a robotic arm and an end effector. The robotic arm includes a plurality of movable joints extending between and to a base end and a distal end. The end effector is disposed at the distal end. The end effector includes a polishing arm, a motor, a tool head, and a belt sensor. The polishing arm includes a motor housing at a distal end of the polishing arm. The motor mounted within the motor housing. The tool head extends along a lengthwise axis between and to an inner end and a tip end. The inner end is mounted on the motor housing. The tool head includes a belt tensioner. The belt tensioner includes a tool extension. The belt tensioner is configured to bias the tool extension outward from the inner end along the lengthwise axis. The tool extension extends between and to a first end and a second end. The tip end is disposed at the second end. The tool extension further includes a first lateral side and a second lateral side. The first lateral side and the second lateral side extend between and to the first end and the second end. The tool head is configured to retain an abrasive belt extending between the motor and the tip end. The belt sensor includes an inductive sensor and a lateral tab. The inductive sensor is disposed on the motor housing. The lateral tab is disposed on the first lateral side at the first end. The inductive sensor is configured to measure a distance between the inductive sensor and the lateral tab and generate an inductive sensor signal representative of the measured distance.

In any of the aspects or embodiments described above and herein, the belt tensioner may further include a tool guide and a spring. The tool guide may include the inner end. The tool guide may be mounted to the motor housing. The spring may be positioned between the tool guide and the tool extension. The spring may be configured to bias the tool extension away from the tool guide along the lengthwise axis.

In any of the aspects or embodiments described above and herein, the tool extension may include an extension body forming an internal bore of the tool extension. The spring and the tool guide may be within the internal bore.

In any of the aspects or embodiments described above and herein, the polishing system may further include the abrasive belt installed on the tool head. The abrasive belt may extend between the motor and the tip end. The abrasive belt may compress the spring between the tool guide and the tool extension.

In any of the aspects or embodiments described above and herein, the belt sensor may include a guide tab mounted to and extending outward from the motor housing. The guide tab may be disposed axially coincident with the lateral tab.

In any of the aspects or embodiments described above and herein, the lateral tab may be disposed in sliding contact with the guide tab.

The present disclosure, and all its aspects, embodiments and advantages associated therewith will become more readily apparent in view of the detailed description provided below, including the accompanying drawings.

DETAILED DESCRIPTION

Figure 1:
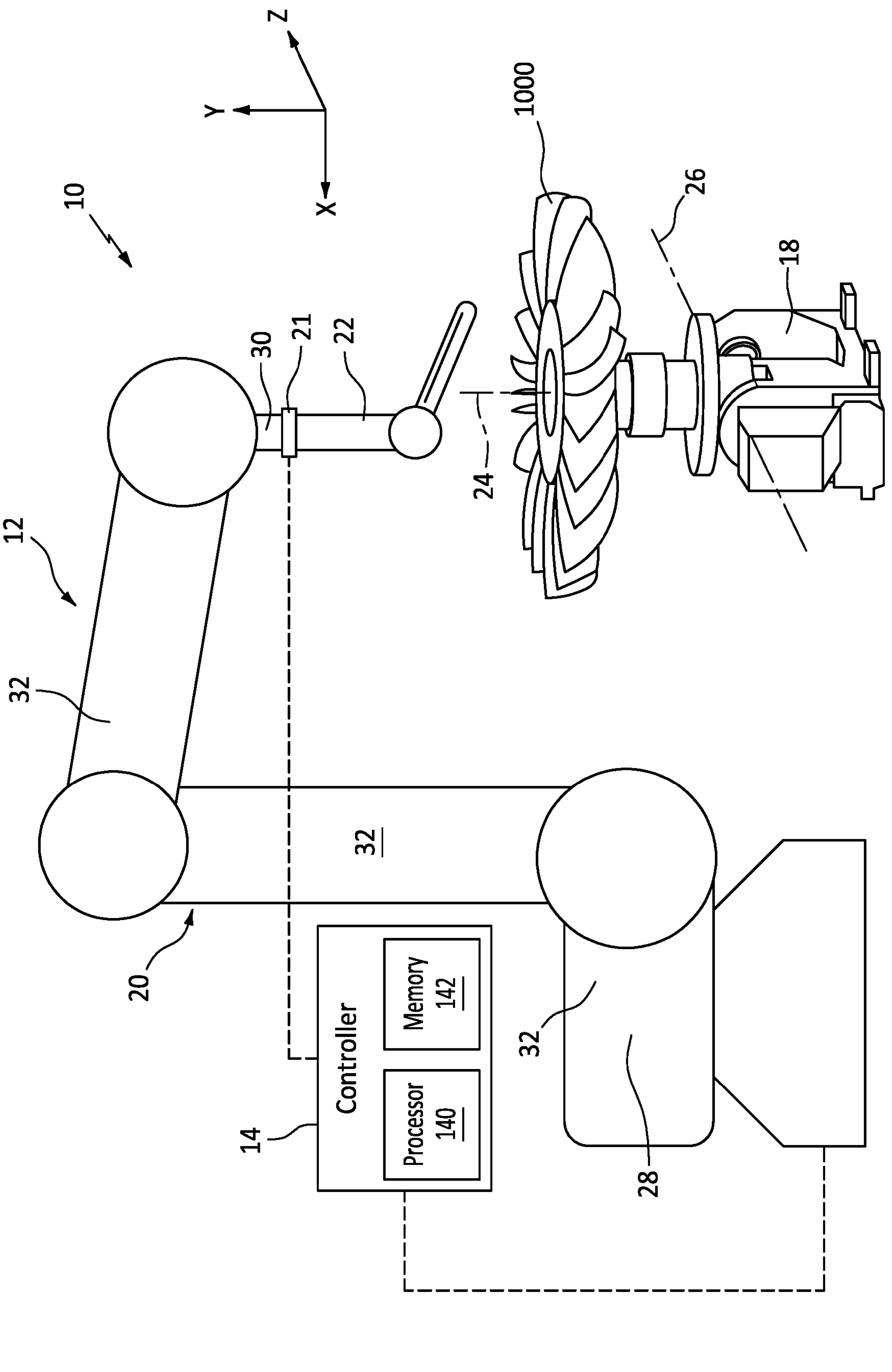
FIG. 1 diagrammatically illustrates a polishing system, in accordance with one or more embodiments of the present disclosure.

FIG. 1 illustrates a polishing system 10 for use in the manufacture of a workpiece 1000. The present disclosure polishing system 10 may provide particular utility when implemented for polishing workpiece 1000 surfaces having complex curvatures, restrictive machining tolerances, and/or hard metals or metal alloys such as, but not limited to, titanium. As an example, the workpiece 1000 of FIG. 1 is a bladed disk ("blisk") for a gas turbine engine fan for an aircraft propulsion system. The present disclosure, however, is not limited to any particular workpiece 1000 type, configuration, or material. Moreover, while the polishing system 10 is discussed herein with respect to the performance of polishing processes, aspects of the present disclosure may also be applicable to grinding or other machining processes. The polishing system 10 of FIG. 1 includes a robotic polishing assembly 12, and a controller 14. The polishing system 10 may be located within or otherwise include an enclosure (not shown) to contain dust and/or other particulate (e.g., titanium dust) which may be produced during a polishing process and which may present fire and/or explosion risk.

The robotic polishing assembly 12 of FIG. 1 provides automated control of one or more machining tools (e.g., polishing tools) based on coded programming instructions executed by a controller (e.g., the controller 14). The robotic polishing assembly 12 of FIG. 1 includes a workpiece positioning fixture 18, a robotic arm 20, a force control device 21, and an end effector 22. To be clear, this robotic polishing assembly 12 configuration of FIG. 1 is exemplary, and the present disclosure polishing system 10 is not limited to use with the particular robotic polishing assembly 12 configuration of FIG. 1.

The workpiece positioning fixture 18 is configured to securely retain and position the workpiece 1000 for a polishing process and/or another machining process. For example, the workpiece positioning fixture 18 may be configured to rotate the workpiece 1000 a first axis 24. The workpiece positioning fixture 18 may additionally or alternatively be configured to rotate (e.g., tilt the workpiece

1000) about a second axis 26. The second axis 26 may be perpendicular to the first axis 24.

The robotic arm 20 includes a base end 28, a distal end 30, and one or more moveable joints 32. Each movable joint 32 may be moved or otherwise controlled, for example, by an independent servo motor or other actuator (not shown). The distal end 30 is connected to the end effector 22. The robotic arm 20 is configured move the end effector 22 relative to the workpiece 1000 and/or to another component or assembly (e.g., a cleaning assembly) of the polishing system 10. For example, the robotic arm 20 may be configured to move the end effector 22 along an x-axis, a y-axis, and a z-axis, as well as to rotate the end effector 22 relative to the x-axis, the y-axis, and the z-axis (e.g., pitch, yaw, and roll).

The force control device 21 connects the robotic arm 20 to the end effector 22. The force control device 21 may be mounted on the distal end 30 of the robotic arm 30. The force control device 21 may be disposed at (e.g., on, adjacent, or proximate) the end effector 22 and may be directly or indirectly mounted to the end effector 22. The force control device 21 may be configured, for example, as an active contact flange including a pneumatic linear actuator (e.g., a bellow-type pneumatic linear actuator) or other linear actuator configured to translate along an axis (e.g., a single, linear axis) to control a position of the end effector 22 relative to the robotic arm 20. The force control device 21 may additionally include a compressor and/or a pressure control assembly (e.g., a pressure control valve) configured to control an air pressure within the pneumatic linear actuator and, thereby, control a linear position of the pneumatic linear actuator including a fully extended position, a fully retracted position, or a plurality of intermediate linear positions between the fully extended position and the fully retracted position. The force control device 21 may additionally include a pressure sensor configured to measure an air pressure within the pneumatic linear actuator. The force control device 21 may be connected in signal communication with the controller 14, for example, to facilitate positional control of the force control device 21 by the controller 14 and to transmit pressure measurements from the pressure sensor to the controller 14. The pressure measurements from the pressure sensor may facilitate calculation, by the controller 14, of force applied (e.g., to a workpiece) by the end effector 22. Exemplary configurations of the force control device 21 may include, but are not limited to, those sold under the ACF® trademark by FerRobotics Compliant Robot Technology GmbH (Austria).

Figure 2:
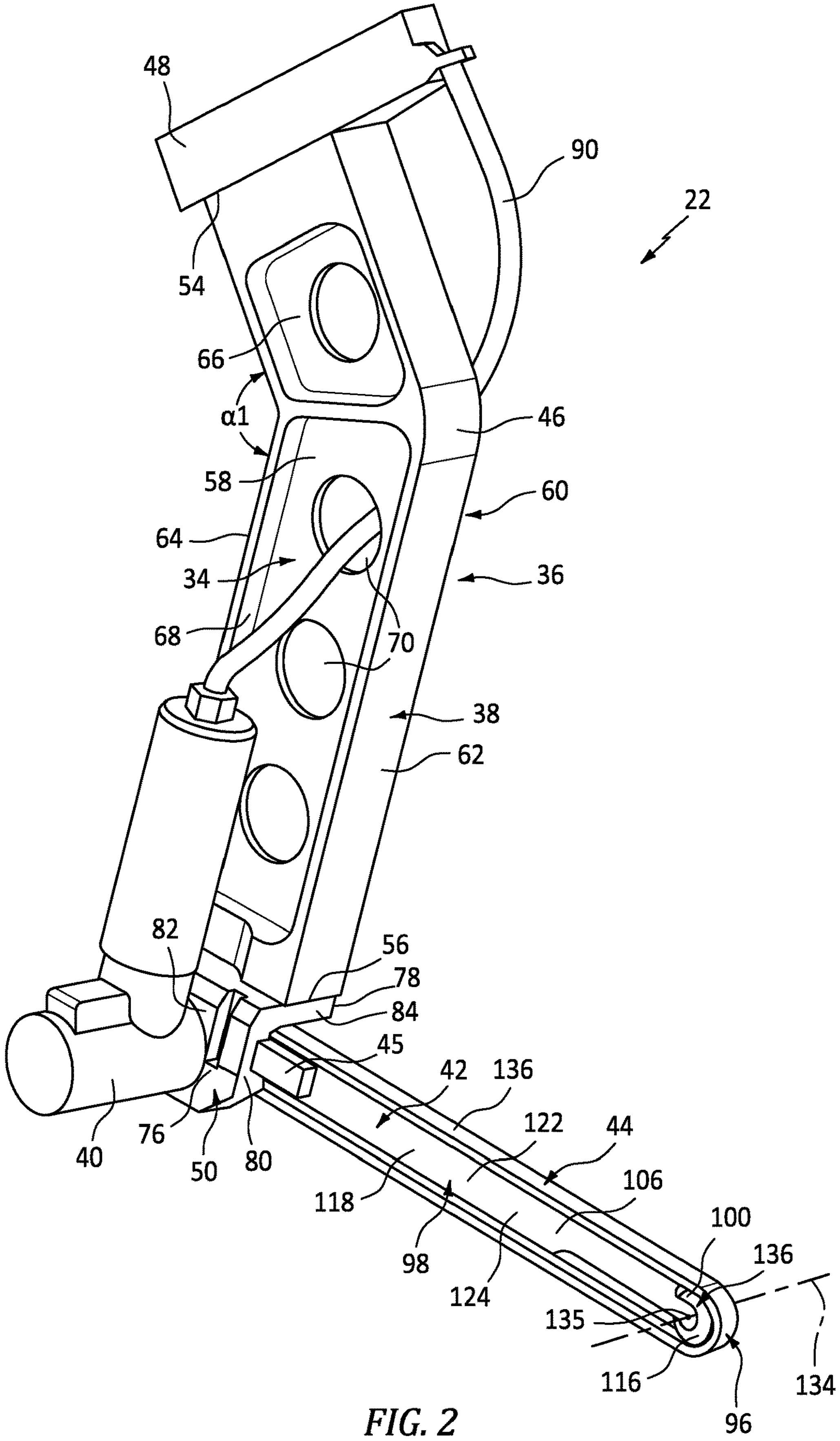
FIG. 2 illustrates a perspective view of an end effector for a polishing system, in accordance with one or more embodiments of the present disclosure.
Figure 3:
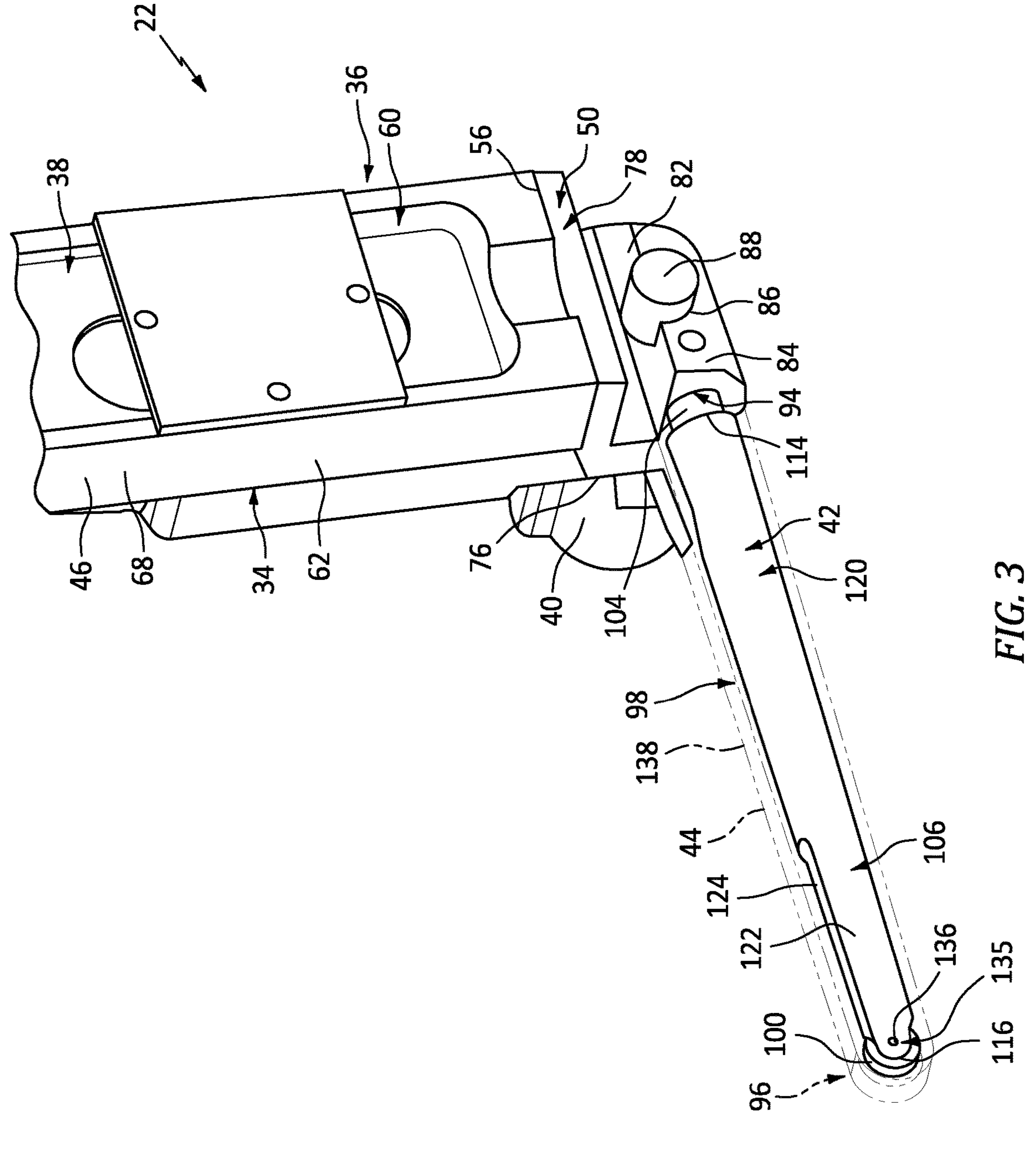
FIG. 3 illustrates another perspective view of an end effector for a polishing system, in accordance with one or more embodiments of the present disclosure.
Figure 4:
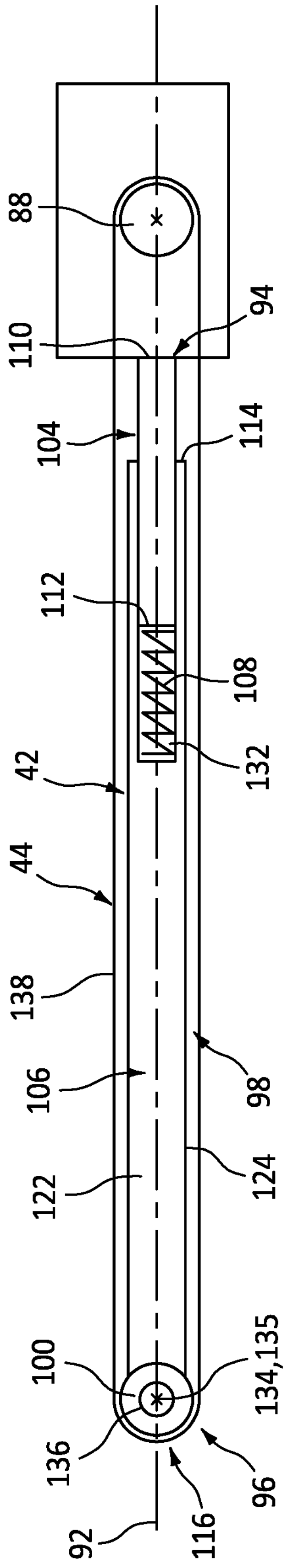
FIG. 4 illustrates a cutaway, side view of a portion of a tool head for a polishing system end effector, in accordance with one or more embodiments of the present disclosure.

FIGS. 2-4 illustrate perspective views of the end effector 22. The end effector 22 of FIGS. 2 and 3 has a first lateral side 34 and a second lateral side 36. The end effector 22 of FIGS. 2 and 3 includes a polishing arm 38, a motor 40, a tool head 42, an abrasive belt 44, and a belt sensor 45. The polishing system 10 (see FIG. 1) may be configured to selectively attach and detach different end effectors 22 to facilitate polishing system 10 performance of different polishing operations or to replace degraded or faulty end effectors 22.

The polishing arm 38 of FIG. 2 includes an arm body 46, an attachment flange 48, and a motor housing 50. The arm body 46 extends (e.g., lengthwise) between and to a proximate end 54 of the arm body 46 and a distal end 56 of the arm body 46. The arm body 46 of FIG. 2 has a first lateral side 58, a second lateral side 60, a front side 62, and a rear side 64. Each of the first lateral side 58, the second lateral side 60, the front side 62, and the rear side 64 extend between and to the proximate end 54 and the distal end 56. The first lateral side 58 and the second lateral side 60 may respectively correspond with the first lateral side 34 and the second lateral side 36. The arm body 46 may include a first body portion 66 and a second body portion 68. The first body portion 66 may extend from the proximate end 54 to the second body portion 68. The second body portion 68 may extend from the first body portion 66 to the distal end 56. The first body portion 66 and the second body portion 68 may extend transversely relative to one another. For example, the first body portion 66 and the second body portion 68 may form an angle $\alpha$ of the arm body 46, which angle $\alpha$ may be understood to be disposed on an imaginary plane extending through the front side 62 and the rear side 64. The arm body 46 of FIG. 2 is illustrated with an angle $\alpha$ of approximately forty-five degrees (45°), however, the present disclosure is not limited to any particular angle $\alpha$ of the arm body 46. The angle $\alpha$ of the arm body 46 may facilitate positioning of the tool head 42 relative to the workpiece 1000 by the robotic arm 20 (see FIG. 1). The arm body 46 may form one or more apertures 70 extending through the arm body 46, for example, from the first lateral side 58 to the second lateral side 60. The apertures 70 may facilitate a reduction in weight of the arm body 46 while also facilitating access and directing pneumatic conduits, sensors cables, and the like for the end effector 22.

The attachment flange 48 is mounted to or otherwise disposed at (e.g., on, adjacent, or proximate) the proximate end 54. The attachment flange 48 is selectively attachable to the robotic arm 20, for example, at (e.g., on, adjacent, or proximate) the force control device 21.

The motor housing 50 is mounted to or otherwise disposed at (e.g., on, adjacent, or proximate) the distal end 56. The motor housing 50 has a first lateral side 76 and a second lateral side 78. The first lateral side 76 and the second lateral side 78 may respectively correspond with the first lateral side 34 and the second lateral side 36. The motor housing 50 includes a housing body 80. The housing body 80 of FIGS. 2 and 3 includes a first mount portion 82 and a second mount portion 84. The first mount portion 82 extends along the first lateral side 76. The first mount portion 82 forms a shaft aperture 86 through the first mount portion 82 in a direction from the first lateral side 76 toward the second lateral side 78. The first mount portion 82 is configured to receive and support the motor 40 at (e.g., on, adjacent, or proximate) the first lateral side 76. The second mount portion 84 extends (e.g., laterally extends) from the first mount portion 82 toward the second lateral side 78. The second lateral side 78 is open to allow the abrasive belt 44 to be installed on and removed from the motor 40.

The motor 40 is mounted to or otherwise disposed at (e.g., on, adjacent, or proximate) the motor housing 50. For example, the motor 40 of FIGS. 2 and 3 is mounted on the first mount portion 82 on the first lateral side 76. The motor 40 includes a rotatable shaft 88. The rotatable shaft 88 extends (e.g., laterally extends) through the shaft aperture 86 to an interior of the motor housing 50. The motor 40 is configured to rotate the rotatable shaft 88 to drive the abrasive belt 44 for a polishing process. The motor 40 of FIGS. 2 and 3 is configured as a pneumatic motor, which pneumatic motor is configured to be driven by a pressurized gas (e.g., air) directed to the motor 40 by a pneumatic conduit 90. The use of a pneumatic motor for the motor 40 may eliminate or reduce the occurrence of sparks during motor 40 operation, thereby facilitating improvements in safety for applications of the present disclosure polishing system 10 (see FIG. 1) which may generate quantities of volatile particulate such as titanium or other metal dust. The present disclosure, however, is not limited to the use of a pneumatic motor for the motor 40, and the motor 40 may alternatively be configured, for example, as an electric motor.

Referring to FIGS. 2-4, the tool head 42 extends along a lengthwise axis 92 between and to an inner end 94 of the tool head 42 and a tip end 96 of the tool head 42. The inner end 94 is disposed at (e.g., on, adjacent, or proximate) the polishing arm 38 (e.g., the motor housing 50). The lengthwise axis 92 may extend orthogonally or substantially orthogonally relative to the arm body 46 (e.g., a lengthwise dimension of the second body portion 68). The present disclosure, however, is not limited to this particular orientation of the lengthwise axis 92 relative to the polishing arm 38. For example, the lengthwise axis 92 may be oriented at any suitable angle relative to the arm body 46 including a colinear orientation of the lengthwise axis 92 relative to the arm body 46. The tool head 42 of FIGS. 2-4 includes a belt tensioner 98 and a roller 100.

The belt tensioner 98 includes a tool guide 104, a tool extension 106, and a biasing member 108. The tool guide 104 is disposed at (e.g., on, adjacent, or proximate) the inner end 94. The tool guide 104 extends (e.g., lengthwise) between and to a first end 110 of the tool guide 104 and a second end 112 of the tool guide 104. The first end 110 is mounted to or otherwise disposed at (e.g., on, adjacent, or proximate) the motor housing 50. For example, the first end 110 of FIGS. 2-4 is mounted (e.g., fixedly mounted) to the second mount portion 84. The tool guide 104 may be configured as a cylindrical body, however, the present disclosure is not limited to any particular shape of the tool guide 104.

The tool extension 106 is disposed at (e.g., on, adjacent, or proximate) the tip end 96. The tool extension 106 extends (e.g., lengthwise) between and to a first end 114 of the tool extension 106 and a second end 116 of the tool extension 106. The tool extension 106 has a first lateral side 118 and a second lateral side 120. The first lateral side 118 and the second lateral side 120 may respectively correspond with the first lateral side 34 and the second lateral side 36. The tool extension 106 includes an extension body 122 extending from the first end 114 to the second end 116. The extension body 122 includes an exterior surface 124. The exterior surface 124 extends between the first end 114 and the second end 116. The exterior surface 124 extends circumferentially about (e.g., completely around) the lengthwise axis 92. For example, the extension body 122 may generally be configured as a cylindrical body.

The extension body 122 forms an internal bore 132 as shown, for example, in FIG. 4. The internal bore 132 extends from the first end 114 toward the second end 116. The internal bore 132 is configured to receive the tool guide 104 (e.g., the second end 112) and to facilitate axial translation (e.g., along the lengthwise axis 92) of the tool extension 106 relative to the tool guide 104.

The biasing member 108 of FIG. 4 is disposed within the internal bore 132. The biasing member 108 is disposed between (e.g., axially between) the tool guide 104 (e.g., the second end 112) and the extension body 122, with respect to the lengthwise axis 92. The biasing member 108 is configured to bias the tool extension 106 away from (e.g., axially away from) the tool guide 104 to apply a tension to the abrasive belt 44 installed on the tool head 42. The biasing member 108 of FIG. 4 is configured as a spring, however, the present disclosure is not limited to the use of a spring for the biasing member 108.

The roller 100 is disposed at (e.g., on, adjacent, or proximate) the tip end 96. The roller 100 is configured to rotate about a rotational axis 134 disposed at a tool center point 135) of the tool head 42. The rotational axis 134 may extend (e.g., laterally extend) through the first lateral side 118 and the second lateral side 120. The roller 100 may be configured with a cylindrical shape, or torus shape, or another suitable shape for controlling movement of the abrasive belt 44. The rotational axis 134 (e.g., the tool center point 135) may be formed by a roller body 136 such as, but not limited to, a shaft, a pin, a dowel, or the like, about which the roller 100 may rotate.

The abrasive belt 44 is installed on the tool head 42 in rotational communication with the rotatable shaft 88 and the roller 100. The abrasive belt 44 includes an abrasive outer surface 138 which is configured for polishing, grinding, or otherwise machining one or more surfaces of a workpiece (e.g., the workpiece 1000). The abrasive outer surface 138 may be configured with a degree of abrasiveness (e.g., coarseness, grit, etc.) which may be selected for a particular polishing operation or workpiece surface). The belt tensioner 98 applies a suitable tension to the abrasive belt 44 to secure the abrasive belt 44 on the rotatable shaft 88 and the roller 100 and to allow the abrasive belt 44 to be driven (e.g., moved) along a path between the rotatable shaft 88 and the roller 100 by rotation of the rotatable shaft 88. A new (e.g., previously unused) abrasive belt 44 may be understood to have a generally unstretched condition relative to an abrasive belt 44 which has previously been used in a polishing or other machining operation. This is because the abrasive belt 44 may be expected to experience gradual degradation through usage, which degradation may be exhibited, at least in part, by stretching of the abrasive belt 44. As the abrasive belt 44 is used for polishing operations, the abrasive belt 44 will stretch and the biasing member 108 will bias the tool extension 106 outward (e.g., away from the tool guide 104) to maintain suitable tension of the abrasive belt 44.

Figure 5:
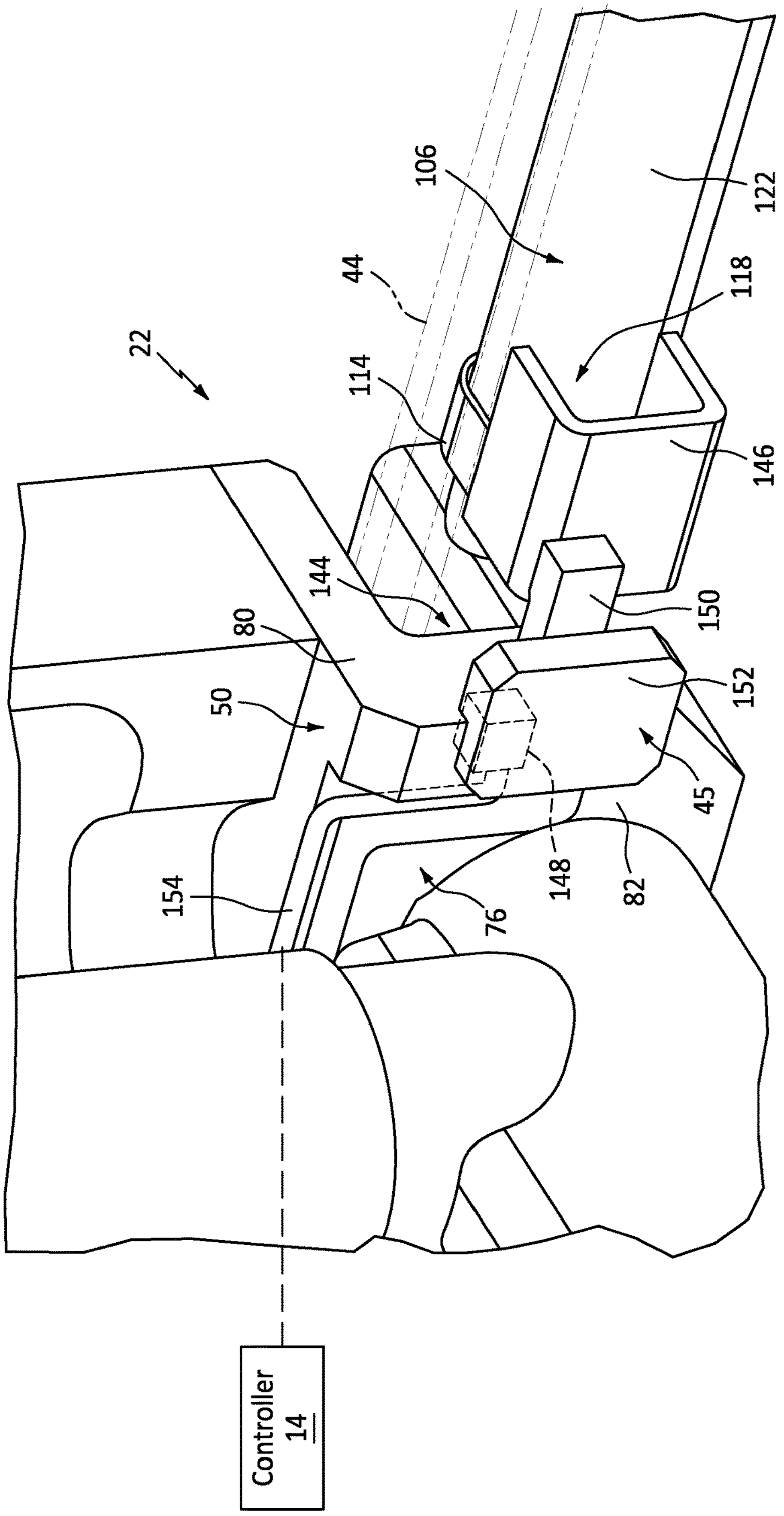
FIG. 5 illustrates a schematic view of a portion of an end effector for a polishing system, in accordance with one or more embodiments of the present disclosure.

FIG. 5 illustrates a portion of the end effector 22 including the belt sensor 45. The belt sensor 45 of FIG. 5 includes a proximity sensor assembly 144 and a lateral tab 146. The proximity sensor assembly 144 is mounted on or otherwise disposed at (e.g., on, adjacent, or proximate) the motor housing 50 (e.g., the housing body 80). For example, the proximity sensor assembly 144 may be mounted to the first mount portion 82 at (e.g., on, adjacent, or proximate) the first lateral side 76. The proximity sensor assembly 144 of FIG. 5 includes a proximity sensor 148, a guide tab 150, and a cover plate 152.

The proximity sensor 148 is configured to detect the presence of a nearby object (e.g., the lateral tab 146) without physical contact and generate an electrical or electronic proximity sensor signal representative of the presence, absence, and/or relative proximity of the object. For example, the proximity sensor 148 may generate an electrical or electronic proximity sensor signal representative of a distance between the proximity sensor 148 and the object. The proximity sensor 148 may be connected in signal communication with the controller 14 using a sensor cable 154. The proximity sensor 148 may be configured, for example, as an inductive proximity sensor configured to detect the presence, absence, and/or relative proximity of a metal object. The proximity sensor 148 of the present disclosure, however, is not limited to an inductive proximity sensor, and alternative proximity sensors such as, but not limited to, a photoelectric sensor, an ultrasonic sensor, a capacitive sensor, and the like may be considered for the proximity sensor 148. The guide tab 150 extends outward from the motor housing (e.g., the housing body 80). For example, the guide tab 150 may extend longitudinally outward from the housing body 80 (e.g., the first mount portion 82) in a direction parallel to or substantially parallel to the lengthwise axis 92 (see FIG. 4). The guide tab 150 may be disposed axially coincident with the lateral tab 146 (e.g., relative to the lengthwise axis 92). The guide tab 150 may be disposed laterally outward of the lateral tab 146 (e.g., relative to the lengthwise axis 92). The cover plate 152 is mounted to or otherwise disposed at (e.g., on, adjacent, or proximate) the housing body 80 (e.g., the first mount portion 82). The cover plate 152 is configured to retain and securely position the proximity sensor 148 and the guide tab 150 on the housing body 80. In some embodiments, the guide tab 150 and the cover plate 152 may form a unitary component.

The lateral tab 146 is mounted to the tool extension 106. For example, the lateral tab 146 of FIG. 5 is mounted to the extension body 122 on the first lateral side 118 and at (e.g., on, adjacent, or proximate) the first end 114. Accordingly, the lateral tab 146 may axially translate (e.g., along the lengthwise axis 92, see FIG. 4) with the tool extension 106. The lateral tab 146 may axially translate (e.g., slide) in contact with the guide tab 150 as the tool extension 106 translates along the lengthwise axis 92. Contact between the lateral tab 146 and the guide tab 150 may facilitate alignment (e.g., circumferential alignment) of the lateral tab 146 with the proximity sensor 148. The lateral tab 146 may be formed all or in part by a metal material, which material may be detected by the proximity sensor 148 configured as an inductive sensor. The lateral tab 146 of FIG. 5 has a "C" cross-sectional shape, however, the present disclosure is not limited to any particular shape of the lateral tab 146.

Referring to FIGS. 1, 2, and 5, the controller 14 is connected in signal communication with the robotic polishing assembly 12 and the belt sensor 45. The controller 14 includes a processor 140 and memory 142. The memory 142 is connected in signal communication with the processor 140. The processor 140 may include any type of computing device, computational circuit, or any type of process or processing circuit capable of executing a series of instructions that are stored in the memory 142, thereby causing the processor 140 to perform or control one or more steps or other processes. The processor 140 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 142 may represent one or more algorithms for controlling aspects of the robotic polishing assembly 12 and/or the belt sensor 45, and the stored instructions are not limited to any particular form (e.g., program files, system data, buffers, drivers, utilities, system programs, etc.) provided they can be executed by the processor 140. The instructions stored in memory 142 may be in the form of G-code, M-code, or another suitable programming language which can be executed by the controller 14 and/or its processor 140. The instructions stored in memory 142 may be generated by computer-aided design (CAD) or computer-aided manufacturing (CAM) software, whereby the physical dimensions of a particular workpiece (e.g., the workpiece 1000) may be translated into instructions (e.g., computer numerical control (CNC) instructions) for execution by the robotic polishing assembly 12. The memory 142 may be a non-transitory computer readable storage medium configured to store instructions that when executed by one or more processors, cause the one or more processors to perform or cause the performance of certain functions. The memory 142 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 14 may be achieved via the use of hardware, software, firmware, or any combination thereof. The controller 14 may also include input and output devices (e.g., keyboards, buttons, switches, touch screens, video monitors, sensor readouts, data ports, etc.) that enable the operator to input instructions, receive data, etc.

Figure 6:
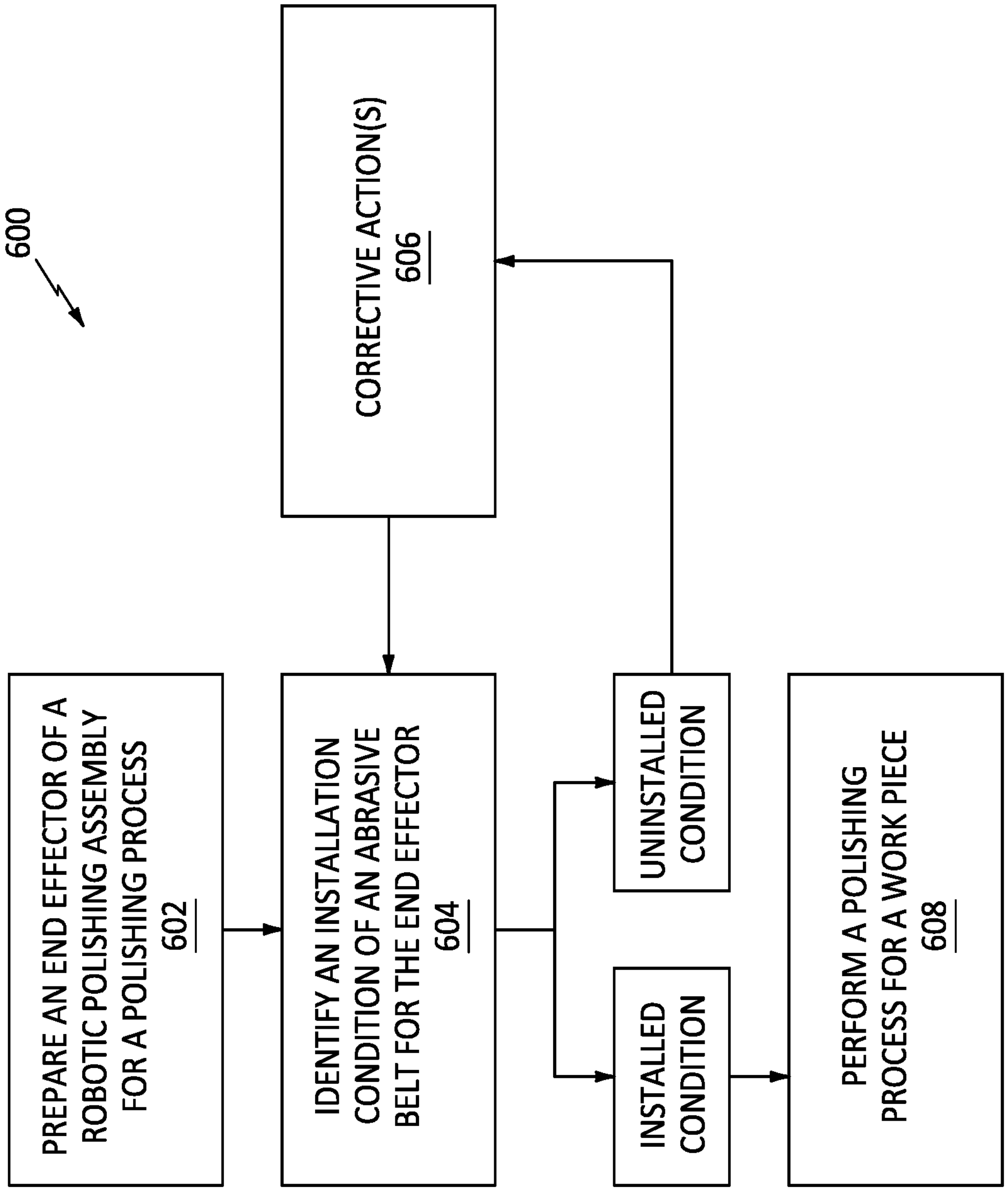
FIG. 6 illustrates a block diagram depicting a method for identifying an abrasive belt installation condition for a polishing system, in accordance with one or more embodiments of the present disclosure.

Referring to FIGS. 1, 5, and 6, a Method 600 for identifying an abrasive belt installation condition for a polishing system is provided. FIG. 6 illustrates a flowchart for the Method 600. The Method 600 may be performed for the polishing system 10, as described herein. The controller 14 may be used to execute or control one or more steps of the Method 600. For example, the processor 140 may execute instructions stored in memory 142, thereby causing the controller 14 and/or its processor 140 to execute or otherwise control one or more steps of the Method 600 using the robotic polishing assembly 12 and/or the belt sensor 45. However, it should be understood that the Method 600 is not limited to use with the polishing system 10 described herein. Unless otherwise noted herein, it should be understood that the steps of Method 600 are not required to be performed in the specific sequence in which they are discussed below and, in various embodiments, the steps of Method 600 may be performed separately or simultaneously. Further, it should be understood that not all of the steps of the Method 600, discussed below, may be required unless otherwise described herein.

Step 602 includes preparing the robotic polishing assembly 12 for a polishing process. Step 602 may include installing a new end effector 22 on the robotic polishing assembly 12. The installed end effector 22 may be one of a plurality of end effectors 22 which may be selectively installed on the robotic polishing assembly 12. The plurality of end effectors 22 may include different configurations of the end effectors 22 (e.g., one or more of the plurality of end effectors 22 may be different than one or more others of the plurality of end effectors 22. Step 602 may include verifying (e.g., with the controller 14) the end effector 22 installed on the robotic polishing assembly 12 is the correct end effector 22 (e.g., the installed end effector 22 is the end effector configuration specified by the polishing process instructions for the controller 14). Additionally or alternatively, Step 602 may include installing a new abrasive belt 44 on the tool head 42. Positioned on the tool head 42, the abrasive belt 44 may compress the belt tensioner 98 such that the biasing member 108 (see FIG. 4) is compressed between the tool extension 106 and the tool guide 104. As the abrasive belt 44 is used for subsequent polishing operations, the abrasive belt 44 will stretch and the biasing member 108 will bias the tool extension 106 outward (e.g., away from the tool guide 104) to maintain suitable tension of the abrasive belt 44. The abrasive belt 44 may be installed (e.g., autonomously installed) by the robotic polishing assembly 12 onto the tool head 42. For example, after a previously installed abrasive belt 44 has been identified as expended, the robotic polishing assembly 12 may remove the expended abrasive belt 44 from the tool head 42 and installed a new abrasive belt 44 onto the tool head 42.

Step 604 includes identifying an installation condition of the abrasive belt 44 on the tool head 42. Installation of the abrasive belt 44 on the tool head 42 will compress the belt tensioner 98 causing the tool extension 106 to be positioned closer too (e.g., axially closer to) the motor housing 50 (e.g., in comparison to the tool extension 106 with no abrasive belt 44 installed on the tool head 42). Installation of the abrasive belt 44 will, therefore, cause the lateral tab 146 to move toward the proximity sensor 148. The proximity sensor 148 may measure a distance between the proximity sensor 148 and the lateral tab 146. The measured distance between the proximity sensor 148 and the lateral tab 146 may be compared to a threshold distance value to identify an installed condition or an uninstalled condition for the abrasive belt 44. For example, the controller 14 may compare the measured distance to a threshold distance value (e.g., a predetermined distance value stored in memory 142). Where the measured distance is less than or equal to the threshold distance value, the controller 14 may identify the installed condition for the abrasive belt 44. Where the measured distance is greater than or equal to the threshold distance value, the controller 14 may identify the uninstalled condition for the abrasive belt 44. The threshold distance value may be selected based on an expected distance between the proximity sensor 148 and the lateral tab 146 for installed and uninstalled conditions of the abrasive belt 44. For example, with the abrasive belt 44 installed on the tool head 42, the distance between the proximity sensor 148 and the lateral tab 146 may range between a minimum installed distance (e.g., for a new abrasive belt 44) and a maximum installed distance (e.g., for an expended abrasive belt 44). The threshold distance value may be selected to be greater than the maximum installed distance and less than a distance between the proximity sensor 148 and the lateral tab 146 with no abrasive belt 44 installed on the tool head 42. Of course, a particular value of the threshold distance value may vary, for example, between different end effector 22 configurations and/or different abrasive belt 44 configurations. Routine experimentation may be performed by a person of ordinary skill in the art to determine a suitable threshold distance value in accordance with and as informed by one or more aspects of the present disclosure. Step 604 may additionally include verifying (e.g., with the controller 14) a belt configuration of the installed abrasive belt 44. For example, the controller 14 may verify the installed abrasive belt has the correct abrasive belt 44 grit specified by the polishing process instructions for the controller 14. The controller 14 may verify the belt configuration of the installed abrasive belt 44 using a color detection technique. For example, the controller 14 may control an imaging device (e.g., a camera, a color sensor, etc.) to identify a color marking on the end effector 22 or the abrasive belt 44, which color marking may be indicative of a particular abrasive belt 44 configuration. The present disclosure, however, is not limited to the foregoing exemplary abrasive belt 44 configuration verification process.

Step 606 includes taking one or more corrective actions for identification of an uninstalled condition for the abrasive belt 44. For example, the controller 14 may control the robotic polishing assembly 12 to prevent the robotic polishing assembly 12 from performing a polishing process (e.g., on the workpiece 1000) while the abrasive belt 44 is identified in the uninstalled condition by the controller 14. The controller 14 may additionally or alternatively generate a notification (e.g., a warning message, a warning light, an audible alarm, etc.) for an operator of the polishing system 10. The controller 14 may additionally or alternatively control the robotic polishing assembly 12 to install a new abrasive belt 44 on the tool head 42 (e.g., to reattempt installation of a new abrasive belt 44 on the tool head 42). The controller 14 may additionally or alternatively control the robotic polishing assembly 12 to remove the installed end effector 22 and to install a new end effector 22 and a new abrasive belt 44 on the tool head 42 of the newly installed end effector 22.

Step 608 includes performing a polishing operation on the workpiece 1000 with the robotic polishing assembly 12 and its end effector 22. For example, after identification of the installed condition for the abrasive belt 44, the controller 14 may control the robotic polishing assembly 12 to perform a polishing operation on the workpiece 1000. Pressurized gas (e.g., air) may be supplied to the motor 40, thereby driving the rotatable shaft 88 and, in turn, the abrasive belt 44. The controller 14 may execute a series of instructions (e.g., a CNC polishing program) to control the robotic polishing assembly 12 to polish or otherwise machine one or more surfaces of the workpiece 1000.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A polishing system comprising:

an end effector including a polishing arm, a motor, a tool head, and a belt sensor, the polishing arm including a motor housing at a distal end of the polishing arm, the motor mounted within the motor housing, the tool head extending along a lengthwise axis between and to an inner end and a tip end, the inner end disposed on the polishing arm at the motor, the tool head including a belt tensioner and a roller, the belt tensioner including a tool guide and a tool extension, the tool guide disposed at the inner end, the tool extension including the tip end, the belt tensioner configured to bias the tip end outward from the inner end and the tool guide along the lengthwise axis, the roller rotatable about a tool center point of the tool head at the tip end, the tool head configured to retain an abrasive belt extending between the motor and the roller, and the belt sensor including a proximity sensor and a lateral tab, the proximity sensor disposed on the motor housing at the inner end, the lateral tab disposed at the tool extension, the proximity sensor configured to measure a distance between the proximity sensor and the lateral tab and generate a proximity sensor signal representative of the measured distance;

a controller in signal communication with the proximity sensor, the controller including a processor in communication with a non-transitory memory storing instructions, which instructions when executed by the processor, cause the processor to:

identify an installation configuration for the abrasive belt by comparing the measured distance to a distance threshold value.

2. The polishing system of claim 1, wherein the instructions, when executed by the processor, further cause the processor to identify the installation configuration for the abrasive belt by identifying:

an installed condition of the abrasive belt for the measured distance less than the distance threshold value; and an uninstalled condition of the abrasive belt for the measured distance greater than the distance threshold value.

3. The polishing system of claim 2, further comprising a robotic polishing assembly including a robotic arm and the end effector, the robotic arm including a plurality of movable joints extending between and to a base end and a distal end, the end effector disposed at the distal end.

4. The polishing system of claim 3, wherein the instructions, when executed by the processor, further cause the processor to control the robotic polishing assembly to prevent the robotic polishing assembly from performing a polishing process on a workpiece with the uninstalled condition identified for the abrasive belt.

5. The polishing system of claim 2, wherein the instructions, when executed by the processor, further cause the processor to verify an abrasive belt configuration with the abrasive belt installed on the end effector, and the abrasive belt configuration includes, at least, a grit of the abrasive belt.

6. The polishing system of claim 1, wherein the proximity sensor is configured as an inductive sensor.

7. The polishing system of claim 1, wherein:

the tool extension extends along the lengthwise axis between and to a first end and a second end, the tip end disposed at the second end, the tool extension further including a first lateral side and a second lateral side, the first lateral side and the second lateral side extending between and to the first end and the second end; and the lateral tab is disposed on the first lateral side at the first end.

8. The polishing system of claim 1, wherein the belt sensor includes a guide tab extending outward from the motor housing, the guide tab disposed axially coincident with the lateral tab, the guide tab further disposed laterally outward of the lateral tab.

9. The polishing system of claim 8, wherein the lateral tab is disposed in sliding contact with the guide tab.

10. The polishing system of claim 1, wherein the belt tensioner further includes a spring, the tool guide mounted to the motor housing, the spring positioned between the tool guide and the tool extension, the spring configured to bias the tool extension away from the tool guide along the lengthwise axis.

11. The polishing system of claim 10, wherein the tool extension includes an extension body forming an internal bore of the tool extension, the spring and the tool guide disposed within the internal bore.

12. A method for identifying an installation condition of an abrasive belt on a tool head of a polishing system, the method comprising:

biasing a tool extension of the tool head outward from a motor housing along a lengthwise axis, the tool head extending along the lengthwise axis between an inner end and a tip end, the inner end disposed at the motor housing, the tool extension disposed at the tip end, the tool extension axially translatable along the lengthwise axis on a tool guide of the tool head disposed at the inner end;

measuring a distance between a proximity sensor and a lateral tab, the proximity sensor disposed on the motor housing and the lateral tab disposed on the tool extension; and identifying an installation condition of the abrasive belt on the tool head by comparing the measured distance to a distance threshold value, the installation condition including an installed condition of the abrasive belt or an uninstalled condition of the abrasive belt.

13. The method of claim 12, wherein identifying the installation condition of the abrasive belt includes identifying the installed condition of the abrasive belt for the measured distance less than or equal to the distance threshold value.

14. The method of claim 12, wherein identifying the installation condition of the abrasive belt includes identifying the uninstalled condition of the abrasive belt for the measured distance greater than or equal to the distance threshold value.

15. A polishing system comprising:

a robotic polishing assembly including a robotic arm and an end effector, the robotic arm including a plurality of movable joints extending between and to a base end and a distal end, the end effector disposed at the distal end, the end effector including a polishing arm, a motor, a tool head, and a belt sensor, the polishing arm including a motor housing at a distal end of the polishing arm, the motor mounted within the motor housing, the tool head extending along a lengthwise axis between and to an inner end and a tip end, the inner end mounted on the motor housing, the tool head including a belt tensioner, the belt tensioner including tool guide and a tool extension, the tool guide disposed at the inner end, the belt tensioner configured to bias the tool extension outward from the inner end and the tool guide along the lengthwise axis, the tool extension extending between and to a first end and a second end, the tip end disposed at the second end, the tool extension further including a first lateral side and a second lateral side, the first lateral side and the second lateral side extending between and to the first end and the second end, the tool head configured to retain an abrasive belt extending between the motor and the tip end, and the belt sensor including an inductive sensor and a lateral tab, the inductive sensor disposed on the motor housing, the lateral tab disposed on the first lateral side at the first end, the inductive sensor configured to measure a distance between the inductive sensor and the lateral tab and generate an inductive sensor signal representative of the measured distance.

16. The polishing system of claim 15, wherein the belt tensioner further includes a spring, the tool guide mounted to the motor housing, the spring positioned between the tool guide and the tool extension, the spring configured to bias the tool extension away from the tool guide along the lengthwise axis.

17. The polishing system of claim 16, wherein the tool extension includes an extension body forming an internal bore of the tool extension, the spring and the tool guide disposed within the internal bore.

18. The polishing system of claim 16, further comprising the abrasive belt installed on the tool head, the abrasive belt extending between the motor and the tip end, the abrasive belt compressing the spring between the tool guide and the tool extension.

19. The polishing system of claim 15, wherein the belt sensor includes a guide tab mounted to and extending outward from the motor housing, the guide tab disposed axially coincident with the lateral tab.

20. The polishing system of claim 19, wherein the lateral tab is disposed in sliding contact with the guide tab.

* * * * *